United States Patent [19]

Kuroki et al.

[11] Patent Number: 5,918,202
[45] Date of Patent: Jun. 29, 1999

[54] ELECTRIC INTERPOLATING APPARATUS AND POSITION INFORMATION DETECTING APPARATUS USING SUCH APPARATUS

[75] Inventors: Hidefumi Kuroki, Utsunomiya; Satoshi Ishii, Tokyo; Hiroshi Kotake; Shinji Ueda, both of Utsunomiya, all of Japan

[73] Assignee: Canon Kabushiki Kaisha, Tokyo, Japan

[21] Appl. No.: 08/897,512

[22] Filed: Jul. 21, 1997

[30] Foreign Application Priority Data

Jul. 26, 1996 [JP] Japan .................................. 8-197471

[51] Int. Cl.$^6$ ............................ H04L 25/17; G06F 13/00
[52] U.S. Cl. ........................ 702/189; 364/723; 395/282; 395/283; 361/635; 361/636; 327/18
[58] Field of Search .................... 702/189, 117, 702/151; 327/1, 18, 334; 361/600, 627, 633, 634, 635, 636, 748, 807, 823; 318/573; 340/825.56; 33/707; 395/280, 281, 282, 283, 287; 364/715.011, 723, 736.01, 736.04

[56] References Cited

U.S. PATENT DOCUMENTS

| | | | |
|---|---|---|---|
| 4,903,213 | 2/1990 | Buhler et al. | 364/474.31 |
| 5,043,932 | 8/1991 | Asghar et al. | 364/723 |
| 5,148,381 | 9/1992 | Sprague | 364/723 |
| 5,257,166 | 10/1993 | Marui et al. | 361/760 |
| 5,331,223 | 7/1994 | Nishijima | 307/529 |
| 5,454,081 | 9/1995 | Thome | 395/281 |
| 5,485,407 | 1/1996 | Ishimoto et al. | 364/577 |
| 5,594,873 | 1/1997 | Garrett | 395/281 |
| 5,594,874 | 1/1997 | Narayanan et al. | 395/284 |
| 5,634,132 | 5/1997 | Pearce et al. | 395/750 |
| 5,636,347 | 6/1997 | Muchnick et al. | 395/283 |
| 5,706,219 | 1/1998 | Ishimoto | 364/724.1 |
| 5,708,799 | 1/1998 | Gafken et al. | 395/500 |
| 5,727,168 | 3/1998 | Inoue et al. | 395/282 |
| 5,732,280 | 3/1998 | Bealkowski et al. | 395/828 |
| 5,758,099 | 5/1998 | Grieco et al. | 395/282 |

FOREIGN PATENT DOCUMENTS 0 569900 A1  11/1993  European Pat. Off. .
59 052711  3/1984  Japan .

OTHER PUBLICATIONS

"Die Auflösung seigern – Eigenschaften und Einsatz eines Interpolator–Schaltkreises für Inkremental–Messsysteme", M. Krauss et al., *Elektronik*, vol. 45, No. 25, pp. 76–78, 80 (Dec. 1996).

*Primary Examiner*—Patrick Assouad
*Attorney, Agent, or Firm*—Fitzpatrick, Cella, Harper & Scinto

[57] ABSTRACT

An interpolating process is performed on an input periodic signal using at least one first circuit board and a second board. Each first circuit board includes a partial circuit for performing the interpolating process. A plurality of these first boards can be mounted on the second board, and a divisional number of the interpolating process can be selected in accordance with the number of first boards mounted on the second board.

18 Claims, 10 Drawing Sheets

ELECTRIC INTERPOLATING APPARATUS AND POSITION INFORMATION DETECTING APPARATUS USING SUCH APPARATUS

BACKGROUND OF THE INVENTION

1. Field of the Invention

The invention relates to an electric interpolating apparatus and a position information detecting apparatus using such an interpolating apparatus. More particularly, the invention can be preferably applied to a position information detecting apparatus such as an encoder or the like with a construction such that a periodic signal is electrically interpolated and to an electric interpolating apparatus which is used for such a detecting apparatus.

2. Related Background Art

A conventional electric interpolating apparatus for an encoder has a signal processing apparatus designed in accordance with the necessary divisional number. In case of manufacturing an electric interpolating apparatus for an encoder with a different divisional number, a circuit and a board have conventionally been designed to quite different specifications.

According to the above conventional electric interpolating apparatus of a position information detecting apparatus, however, since it is necessary to manufacture a different circuit board for every divisional number, there are problems such that large costs are required for designing and manufacturing, and the management is also complicated.

SUMMARY OF THE INVENTION

It is an object of the invention to provide an electric interpolating apparatus which can cope with a change in divisional number while commonly using a standard board and which can be easily designed and manufactured and to provide a position information detecting apparatus using such an interpolating apparatus.

The above and other objects and features of the present invention will become apparent from the following detailed description and the appended claims with reference to the accompanying drawings.

DETAILED DESCRIPTION OF THE PREFERRED EMBODIMENTS

Figure 1:
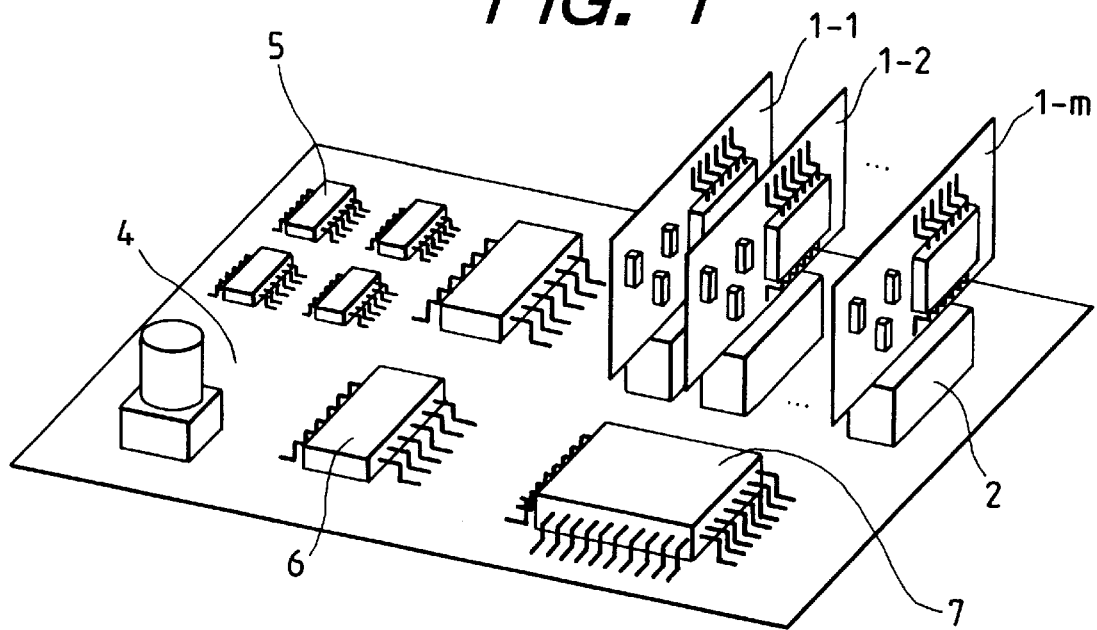
FIG. 1 is an external view of a signal processing unit according to the first embodiment of the invention.

FIG. 1 is an external view of a signal processing unit of an encoder according to the first embodiment of the invention.

In the diagram, reference numerals 1-1 to 1-m (m is a natural number) denote n-dividing boards (n is an even number of 4 or more); 2 a connector for connecting the n-dividing board; 4 a base board; 5 a phase converter; 6 a detecting circuit; and 7 an interpolation signal forming circuit.

In the embodiment, a plurality of connectors 2 for inserting the n-dividing boards 1-1 to 1-m each having a function to divide an electric signal by n are mounted on the base board 4. By inserting the n-dividing boards of the number according to the desired divisional number into the connectors 2, it is possible to obtain to various divisional numbers.

The wording "n dividing" used here denotes that n-leading and training edge informations of a rectangular wave are obtained within one period of input 2-phase signals. For example, when four rectangular wave signals whose phases are deviated by every 45° are included, a total of eight leading and trailing edges exist in one period of the input signal, so that the divisional number is equal to 8.

Figure 2:
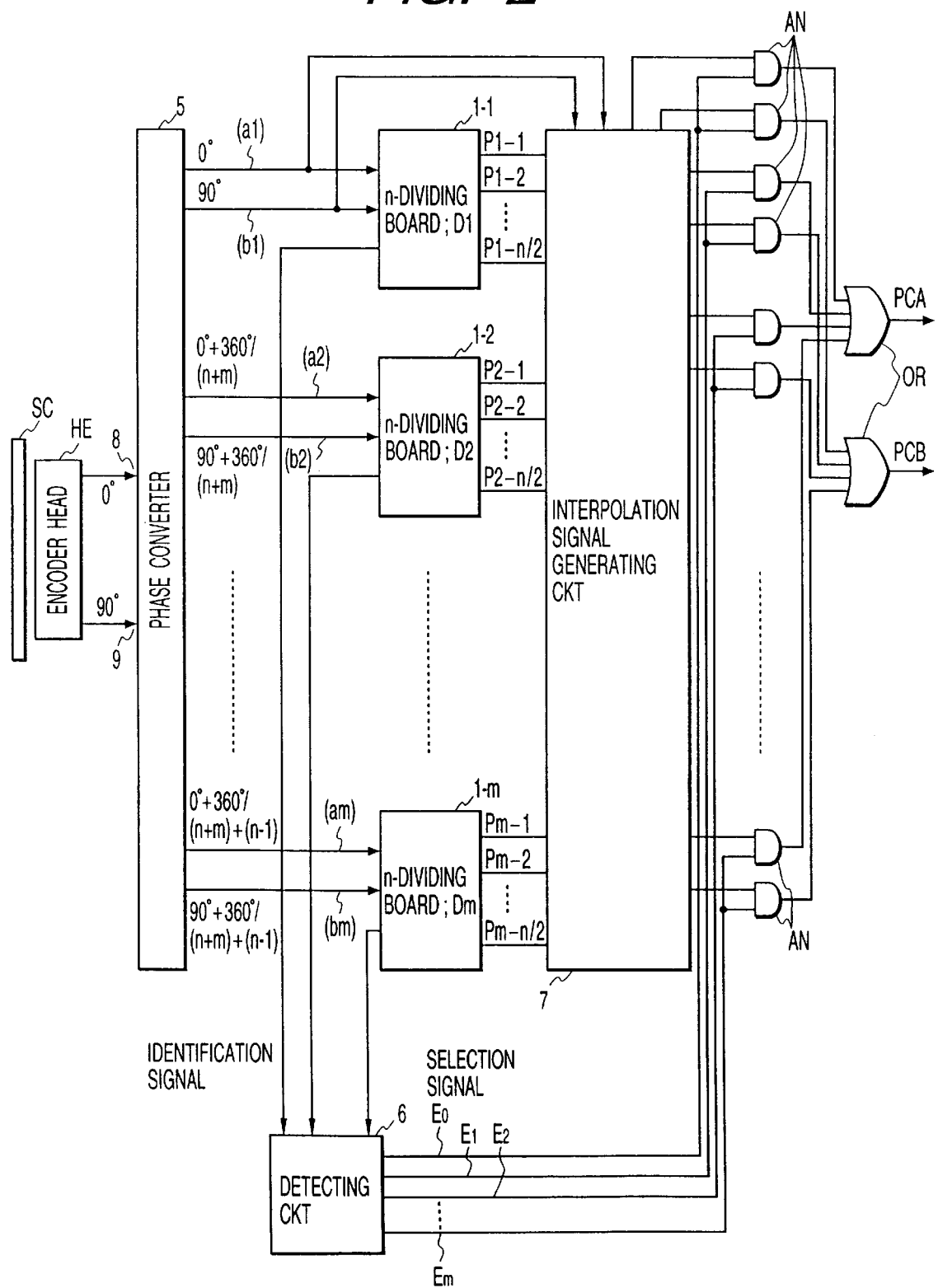
FIG. 2 is an explanatory diagram of a specific construction of the signal processing unit in the embodiment.

FIG. 2 is an explanatory diagram of a specific construction of a signal processing unit in the embodiment. The same component elements as those in FIG. 1 are designated by the same reference numerals hereinbelow.

In the diagram, reference character SC denotes a scale provided with a diffraction grating or the like arranged on a moving object and HE indicates an encoder head for optically detecting the scale SC and outputting 2-phase signals (periodic signals whose phases are different) according to a relative displacement of the scale. Since detailed constructions of the scale SC and encoder head HE are well known, their descriptions are omitted here. They are omitted in FIG. 1 and FIG. 3 and subsequent drawings for simplicity of explanation.

The phase converter 5 forms m sets of sine wave-shaped 2-phase signals (a1, b1), (a2, b2), . . . , and (am, bm) as shown in the diagram from two sine wave-shaped input signals whose phases are equal to, for example, 0° and 90° which are outputted from the encoder head HE and inputted from input terminals 8 and 9, respectively. The phase of each signal is deviated from that of the adjacent 2-phase signal by only $360°/(n \times m)$.

Each of the n-dividing boards 1-1 to 1-m generate a rectangular wave signal of a different phase obtained by dividing one period of each 2-phase signal that is inputted by n.

Interpolated 2-phase rectangular wave signals (interpolation output signals) PCA and PCB are generated by the interpolation signal forming circuit 7 constructed by a logic gate or the like and a switch construction, which will be explained hereinlater. The interpolation output signals PCA and PCB become digital signals indicative of the relative displacement of the scale SC at a high resolution. In the embodiment, by providing the detecting circuit 6, an AND circuit AN, and an OR circuit OR, the interpolation output signals PCA and PCB can be generated by only the signals from the inserted n-dividing boards. Explanation will now be described hereinbelow further in detail.

In the n-dividing board 1-1, the rectangular wave signal in which one period is divided by n is obtained by using the signals having the phases of 0° and 90° which are transmitted from the phase converter 5 as references.

In the n-dividing board 1-2, the signal in which one period is divided by n is likewise obtained by using the signals having the phases of 360°/(n×m) and 360°/(n×m)+90° which are transmitted from the phase converter 5 as references.

In a manner similar to the above, the n-dividing signals are likewise obtained in the n-dividing boards 1-3 to 1-m. In the last n-dividing board 1-m, the signal in which one period is divided by n are obtained by using the signals having the phases of {360°/(n×m)}×(m−1) and {360°/(n×m)}×(m−1)+90° which are transmitted from the phase converter 5 as references.

That is, the apparatus of the embodiment is constructed so as to obtain m sets of signals which were divided by n in a form so as to be mutually interpolated. Therefore, by processing those signals by a logic circuit of the interpolation signal generating circuit 7, in the embodiment, the interpolation of (n×m) division is substantially realized. Actually, in the interpolation signal generating circuit 7, interpolation signals for (n×1), (n×2), . . . , (n×m) divisions are formed. Signals having the same periods as those of the signals a1 and b1 and those interpolation signals are individually outputted.

The detecting circuit 6 obtains mounting detection signals from one or a plurality of pins of each of the n-dividing boards through each connector 2, thereby detecting whether the n-dividing board has been mounted in each connector 2 or not. The detecting circuit 6 generates a selection signal to select the interpolation signal corresponding to the number of existing n-dividing boards.

Interpolation signals for non-dividing (signals for 4-dividing which have the same period as that of the original signals a1 and b1) obtained by the interpolation signal forming circuit 7, interpolating signals for (n×1), (n×2), . . . , (n×m)-dividing, and selection signals E0, E1, E2, . . . , Em from the detecting circuit 6 are inputted to the AND gates AN as shown in the diagram, thereby changing over electric circuit constructions corresponding to the interpolations for (n×1), (n×2), . . . , (n×m)-dividing, respectively. For example, when the number of n-dividing boards which are mounted is equal to 0, 1, 2, . . . , m, respectively, the selection signals are transmitted to the AND gates to which the interpolation signals whose divisional numbers correspond to the divisional numbers of 4, (n×1), (n×2), . . . , and (n×m) are inputted.

Thus, the selected interpolation signal for dividing is outputted from OR of the OR gate, so that a plurality of divisional numbers can be selected by the common board and the number of kinds of circuit boards can be minimized.

The detecting circuit 6 and interpolation signal generating circuit 7 can be also constructed as a one-chip device by a PLD or a Gate Array.

A detailed construction, particularly, a construction such that the interpolating positions of n-dividing boards are detected and the logic circuit is changed over will now be specifically described with reference to FIG. 3 and subsequent drawings.

For easy understanding of explanation, it is now specifically assumed that n=8 and m=4 hereinbelow. That is, the embodiment will now be explained on the assumption that four n-dividing boards to be divided by 8 can be mounted and the input signal is divided by maximum 32 numbers. In this case, four connectors to insert the n-dividing boards for dividing the electric signal by 8 are mounted on the base board.

Figure 3:
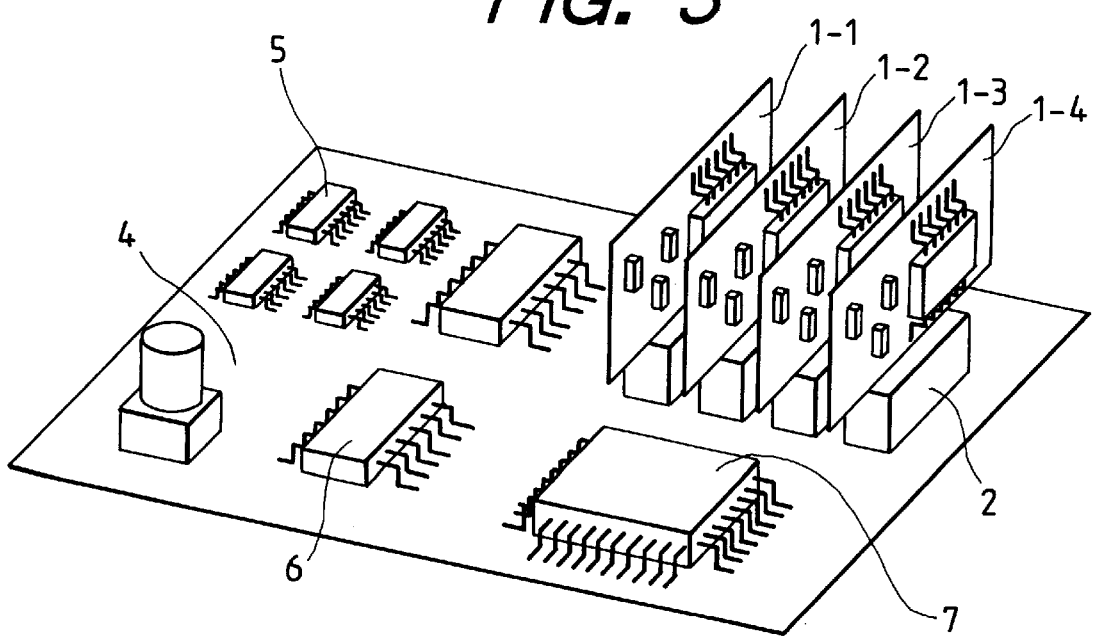
FIG. 3 is an external view in the case where four n-dividing boards are mounted on a base board.
Figure 4:
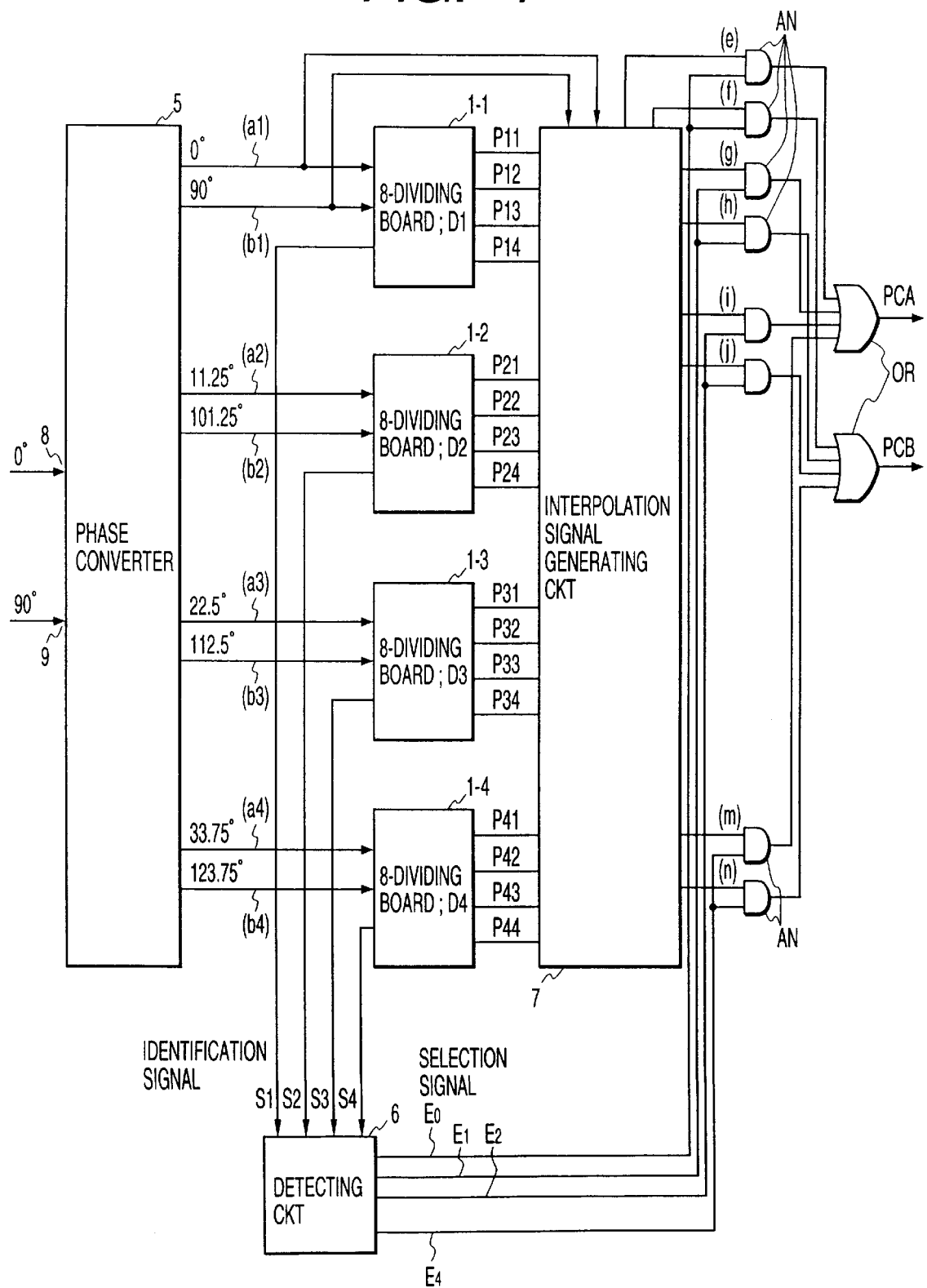
FIG. 4 is an explanatory diagram of a specific construction of a circuit in the case where four n-dividing boards are mounted on the base board.
Figure 5:
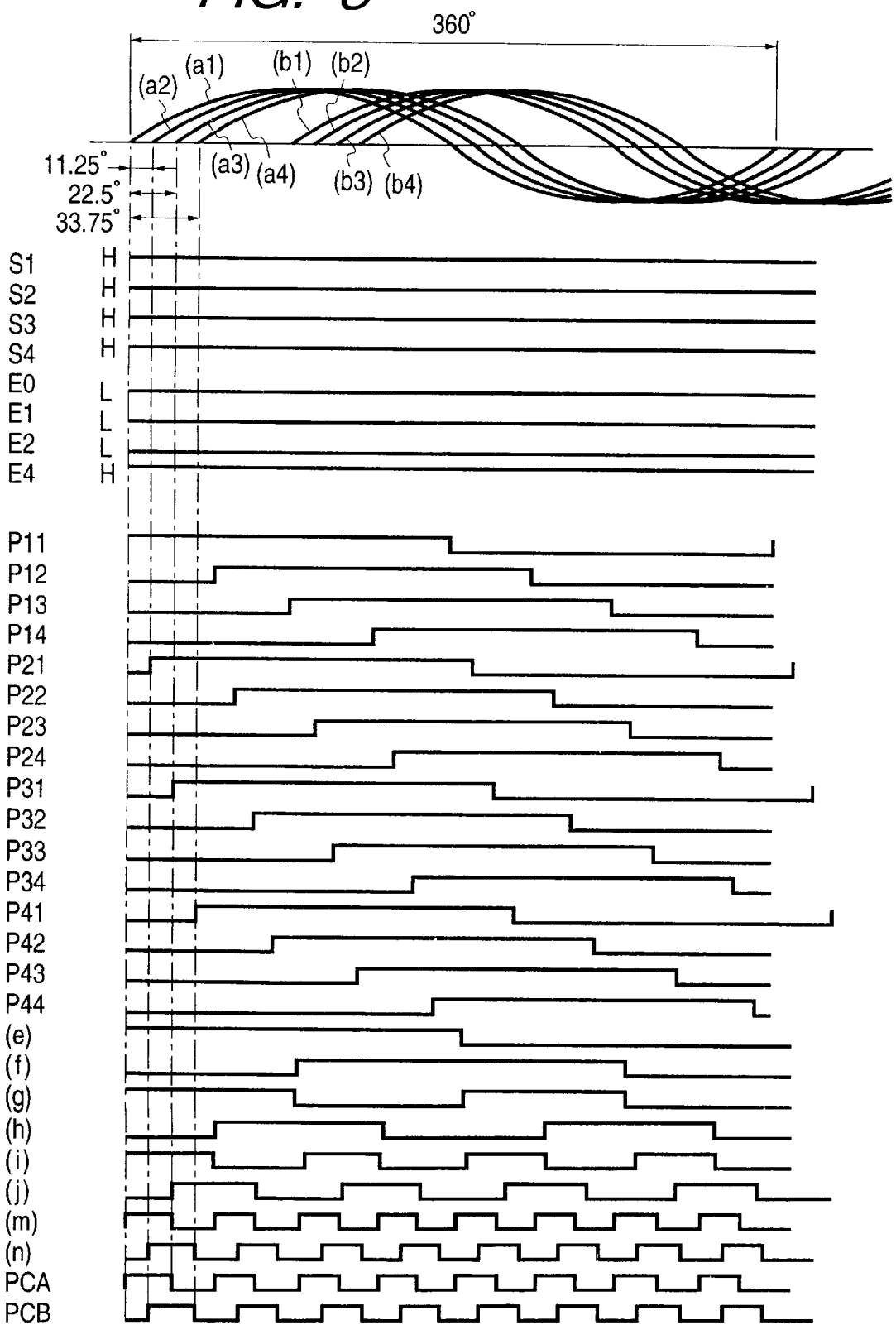
FIG. 5 shows a waveform example of each section in the case where four n-dividing boards are mounted on the base board.

FIG. 3 is an external view in the case where four n-dividing boards are mounted on the base board in the embodiment. FIG. 4 is an explanatory diagram of a specific construction of a circuit in this case. FIG. 5 shows a waveform example of each section.

The phase converter 5 forms four sets of sine wave-shaped 2-phase signals (a1, b1), (a2, b2), (a3, b3), and (a4, b4) as shown in FIG. 5 from the two sine wave-shaped input signals having the phases of 0° and 90° which are inputted from the input terminals 8 and 9. The 2-phase signals are inputted to the n-dividing boards 1-1 to 1-4, respectively.

Each of the n-dividing boards 1-1 to 1-4 forms four rectangular wave signals whose phases are 45° apart and in which one period of the 2-phase signals which are inputted is divided by 8.

Specifically speaking, in the n-dividing board 1-1, signals P11 to P14 whose phases are 45° apart and in which one period is divided by 8 are obtained by using the signals a1 and b1 having the phases of 0° and 90° which are transmitted from the phase converter 5 as references.

In the n-dividing board 1-2, signals P21 to P24 whose phases are 45° apart and in which one period is divided by 8 are obtained by using the signals a2 and b2 having phases of 11.25° and 101.25° which are transmitted from the phase converter 5 as references.

In the n-dividing board 1-3, signals P31 to P34 whose phases are 45° apart and in which one period is divided by 8 are obtained by using the signals a3 and b3 having the phases of 22.5° and 112.5° which are transmitted from the phase converter 5 as references.

In the n-dividing board 1-4, signals P41 to P44 whose phases are 45° apart and in which one period is divided by 8 are obtained by using the signals a4 and b4 having the phases of 33.75° and 123.75° which are transmitted from the phase converter 5 as references.

As mentioned above, in the embodiment, four sets of signals in which one period is divided by 8 are obtained in a form so as to be mutually interpolated. 4-dividing interpolation signals e and f, 8-dividing interpolation signals g and h, 16-dividing interpolation signals i and j, and 32-dividing interpolation signals m and n are generated by the interpolation signal generating circuit 7 to which those signals and the signals a1 and b1 are inputted. Therefore, by using the edges of both waveforms of the signals m and n, information in which one period of the original sine wave signal is divided by 32 is derived.

The detecting circuit 6 serving as mounting detecting means for detecting the presence or absence of the mounting of the n-dividing boards onto the base board 4. The mounting positions and the circuit selection for switching the circuit construction on the base board to the electric circuit construction corresponding to the mounting conditions of the n-dividing boards in accordance with the information obtained by the detecting circuit 6 will now be described in detail hereinbelow.

On the basis of the signals a1 and b1 and the four sets of signals whose phases are 11.25° apart and which are transmitted from the phase converter 5 as mentioned above, the interpolation signal forming circuit 7 generates the following signals: the 4-dividing interpolation signals e and f having the same period as that of the signals a1 and b1; the 8-dividing interpolation signals g and h for dividing one period of the signals a1 and b1 by 8 by using the signals P11 to P14; the 16-dividing interpolation signals i and j for dividing one period of the signals a1 and b1 by 16 by using the signals P11 to P14 and P31 to P34; and 32-dividing interpolation signals m and n for dividing one period of the signals a1 and b1 by 32 by using the signals P11 to P14, P21 to P24, P31 to P34, and P41 to P44.

The detecting circuit 6 receives mounting identification signals S1, S2, S3, and S4 from the four n-dividing boards for dividing by 8 and outputs the selection signals E0, E1, E2, and E4 in accordance with the conditions of the mounting identification signals S1, S2, S3, and S4, respectively.

As shown in FIG. 4, each of the interpolation signals obtained by the interpolation signal forming circuit 7 and the preceding selection signals E0, E1, E2, and E4 from the detecting circuit 6 are inputted to the AND gates. The OR operation is finally performed therefor, thereby obtaining the interpolation output signals PCA and PCB corresponding to the necessary divisional number.

As shown in FIG. 5, when four dividing boards are mounted, all of the identification signals S1, S2, S3, and S4 are set to the "H" level. When all of the identification signals S1, S2, S3, and S4 are at the "H" level, the detecting circuit 6 outputs the selection signals E0, E1, E2, and E4 at the "L", "L ", "L", and "H" levels, respectively.

Therefore, the interpolation signals m and n for dividing by 32 are selected from the respective interpolation signals obtained by the interpolation signal generating circuit 7. The OR operation is finally performed (since the other input signals are directed to the "L" level, the signals m and n are eventually outputted), thereby obtaining the interpolation output signals PCA and PCB corresponding to the divisions by 32.

A case where two n-dividing boards for 8-dividing are mounted to thereby perform the division by 16 in the embodiment will now be described hereinbelow.

Figure 6:
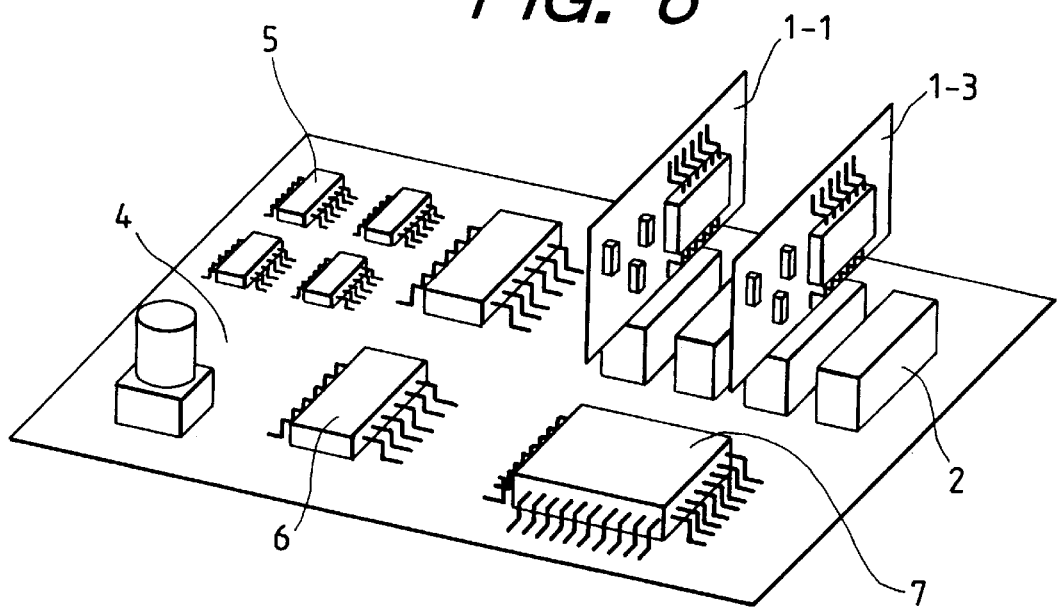
FIG. 6 is an external view in the case where two n-dividing boards are mounted on the base board.
Figure 7:
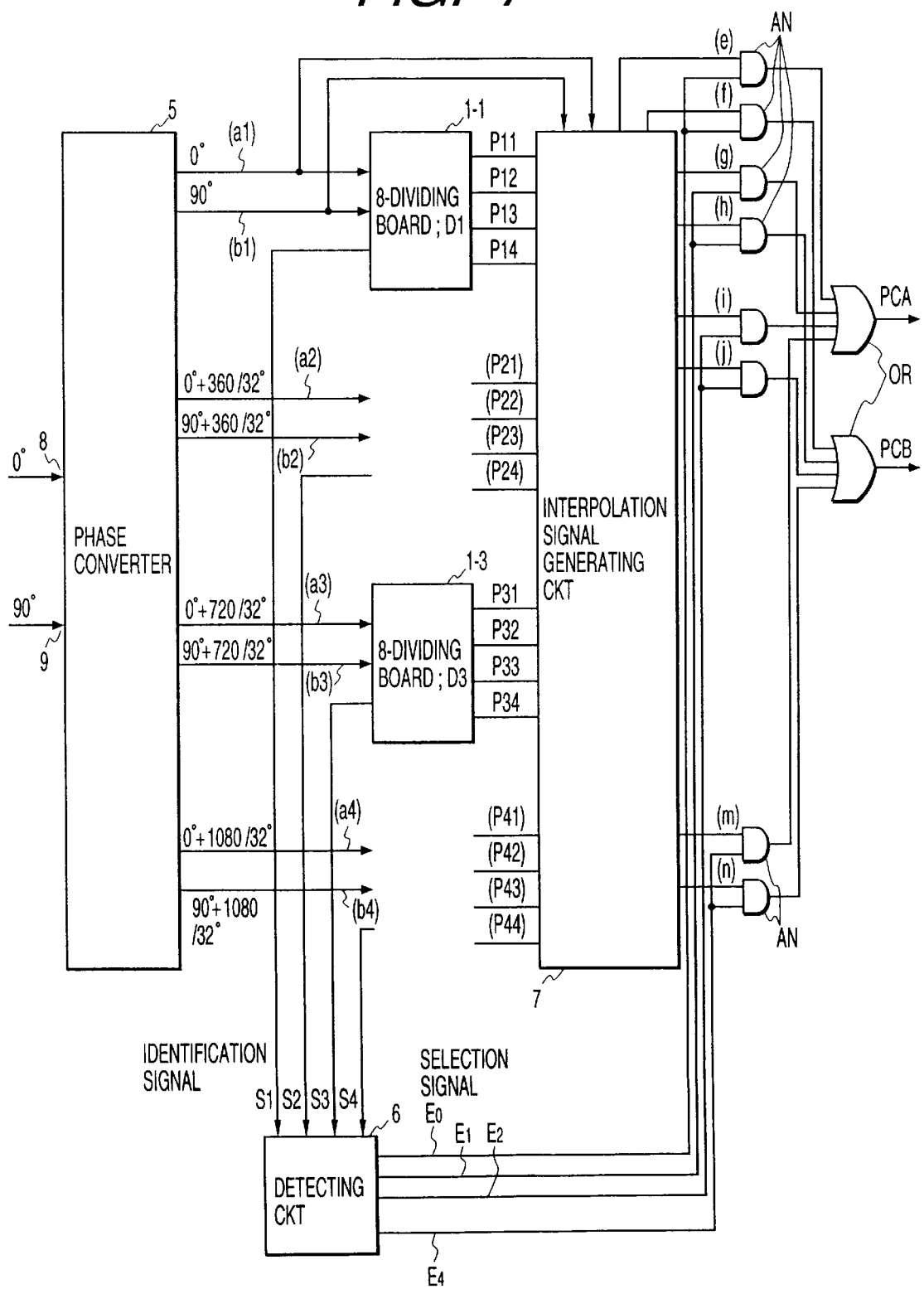
FIG. 7 is an explanatory diagram of a specific construction of a circuit in the case where two n-dividing boards are mounted on the base board.
Figure 8:
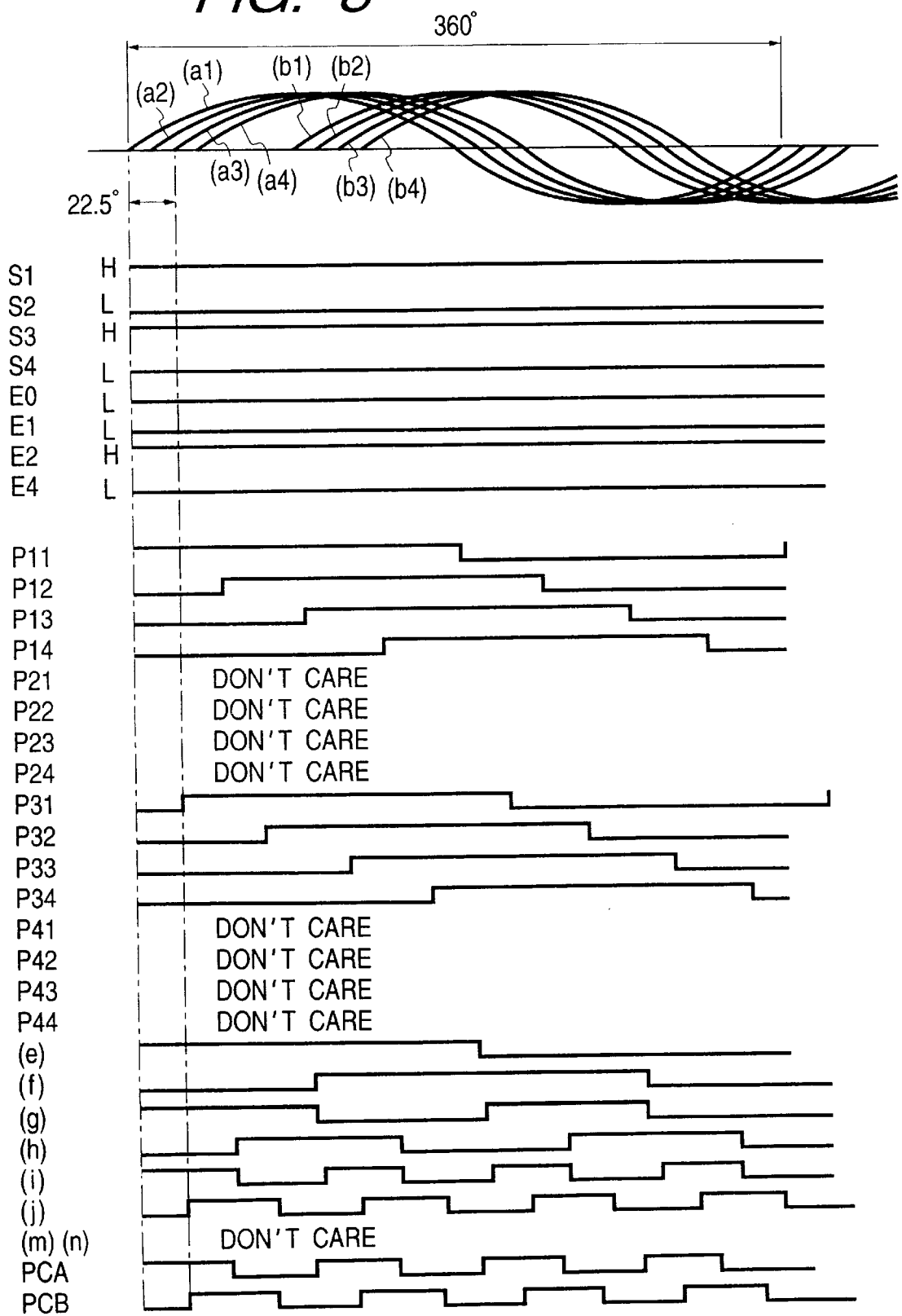
FIG. 8 shows a waveform example of each section in the case where two n-dividing boards are mounted on the base board.

FIG. 6 is an external view in case of mounting two n-dividing boards onto the base board in the embodiment. FIG. 7 is an explanatory diagram of a specific construction of a circuit in this case. FIG. 8 shows a waveform example of each section in this instance.

In this case, in the n-dividing board 1-1, the signals P11 to P14 whose phases are 45° apart and in which one period is divided by 8 are obtained by using the signals having the phases of 0° and 90° which are transmitted from the phase converter 5 as references. In the n-dividing board 1-3, the signals P31 to P34 whose phases are 45° apart and in which one period is divided by 8 are obtained by using the signals having the phases of 22.5° and 112.5° which are transmitted from the phase converter 5 as references. Since there are no other n-dividing boards, only those eight signals and the original signals a1 and b1 are inputted to the interpolation signal generating circuit 7.

On the basis of the signals a1 and b1 and the signals P11 to P14 and P31 to P34 obtained from the n-dividing boards 1-1 and 1-3, the interpolation signal generating circuit 7 generates the following signals: the 4-dividing interpolation signals e and f having the same period as that of the signals a1 and b1, the 8-dividing interpolation signals g and h for dividing one period of the signals a1 and b1 by 8 by using the signals P11 to P14, and the 16-dividing interpolation signals i and j for dividing one period of the signals a1 and b1 by 16 by using P11 to P14 and P31 to P34, respectively.

As shown in FIG. 8, when the n-dividing boards 1-2 and 1-4 are not mounted, the identification signals S1 and S3 are set by the "H" level and the identification signals S2 and S4 are set by the "L" level. When the identification signals S1 and S3 are directed to the "H" level and the identification signals S2 and S4 are directed to the "L" level, the detecting circuit 6 outputs the selection signals E0, E1, E2, and E4 at the "L", "L", "H", and "L" levels, respectively.

Therefore, the 16-dividing interpolation signals i and j are selected from each of the interpolation signals obtained by the interpolation signal forming circuit 7 and the OR operation is finally performed therefor, thereby obtaining the interpolation output signals PCA and PCB corresponding to the 16 numbers of divisions.

Similarly, when only one n-dividing board 1-1 is mounted in the embodiment, on the basis of the signals a1 and b1 and the signals P11 to P14 derived from the n-dividing board 1-1, the interpolation signal forming circuit 7 generates the 4-dividing interpolation signals e and f having the same period as that of the signals a1 and b1 and the 8-dividing interpolation signals g and h for dividing one period of the signals a1 and b1 by 8 by using the signals P11 to P14, respectively. In this case, the identification signal S1 is set by the "H" level and the identification signals S2, S3, and S4 are set by the "L" level. The detecting circuit 6 generates the selection signals E0, E1, E2, and E4 by the "L", "H", "L", and "L" levels, respectively. The 8-dividing interpolation signals g and h are selected from each of the interpolation signals obtained by the interpolation signal generating circuit 7 and the interpolation output signals PCA and PCB corresponding to the interpolation of the 8-division are obtained.

A case where the n-dividing board for 8-dividing is not mounted in the embodiment will now be described hereinbelow.

Figure 9:
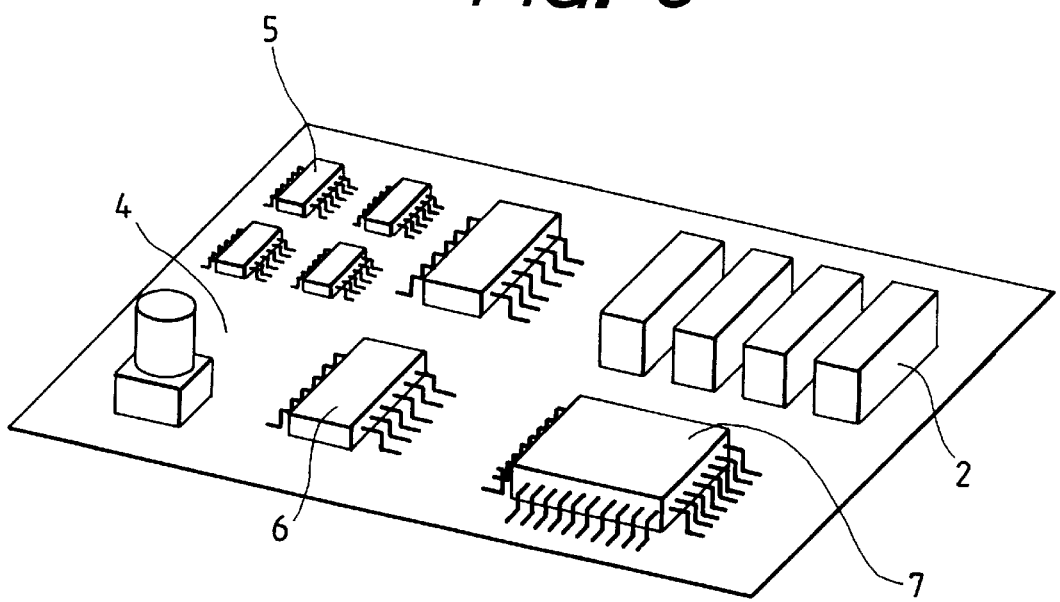
FIG. 9 is an external view in the case where the n-dividing board is not mounted on the base board.
Figure 10:
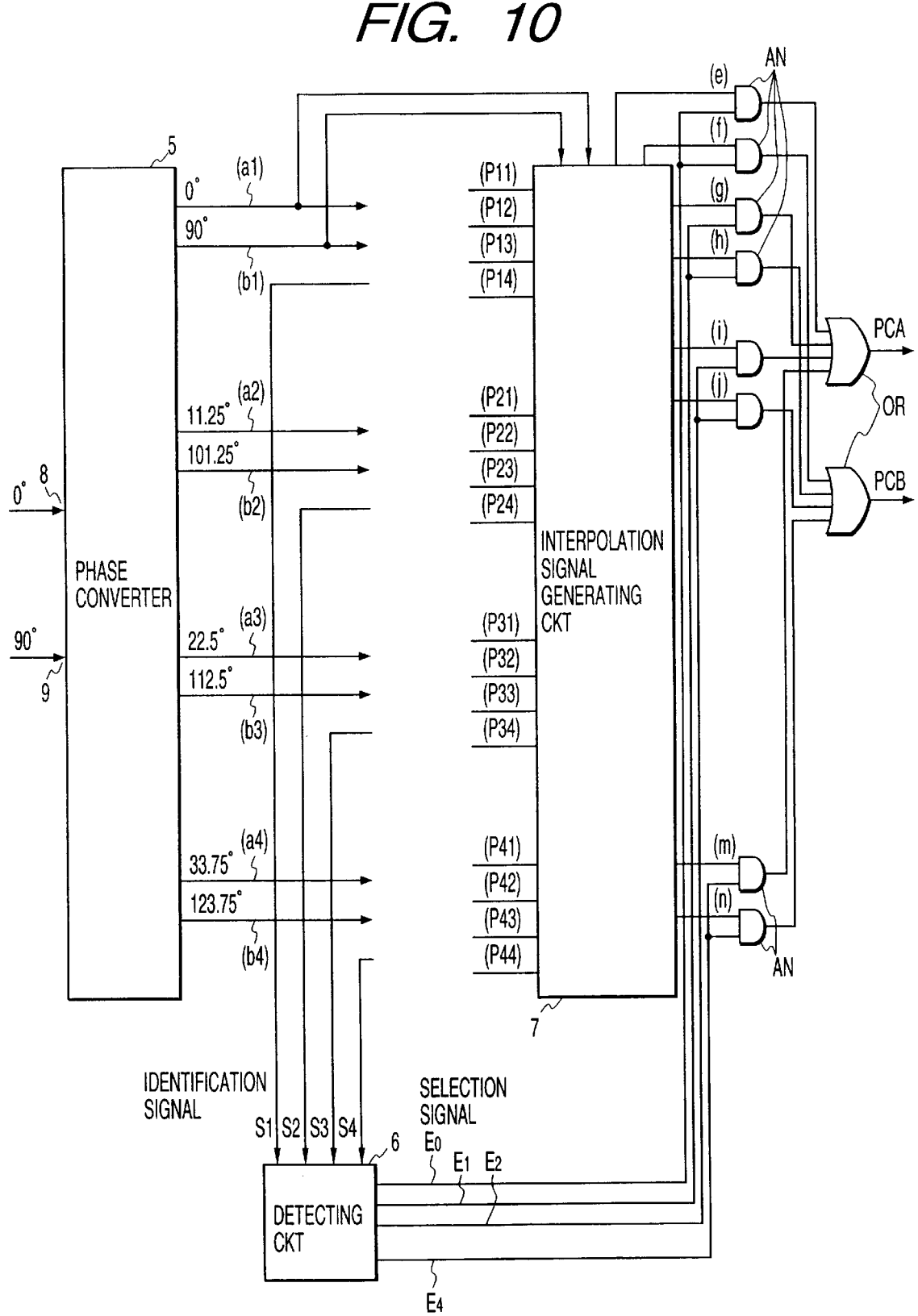
FIG. 10 is an explanatory diagram of a specific construction of a circuit in the case where the n-dividing board is not mounted on the base board.
Figure 11:
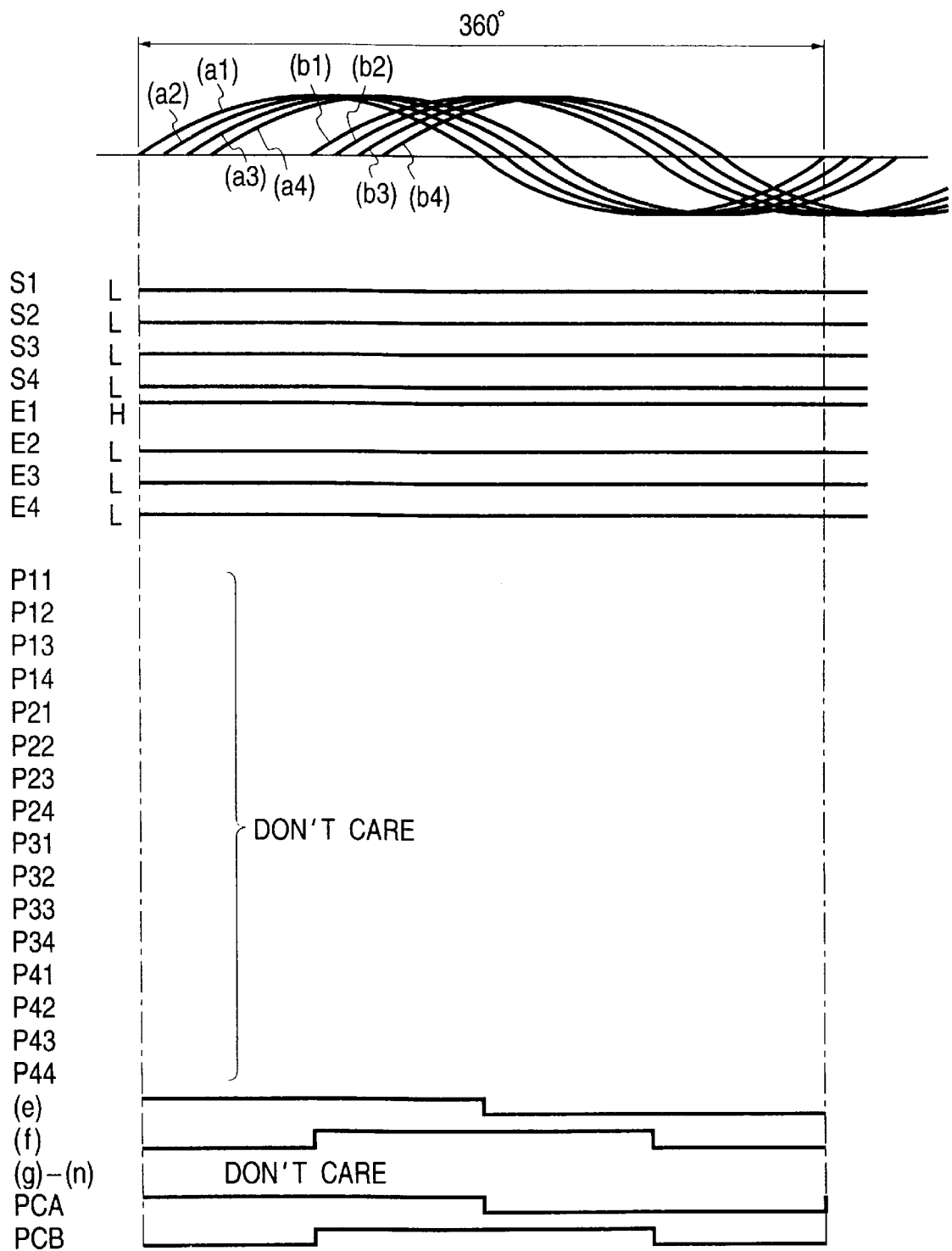
FIG. 11 shows a waveform example of each section in the case where the n-dividing board is not mounted on the base board.

FIG. 9 is an external view in the case where the n-dividing board is not mounted on the base board in the embodiment. FIG. 10 is an explanatory diagram of a specific construction of a circuit in this case. FIG. 11 shows a waveform example of each section at this time.

When no n-dividing board is mounted, the detecting circuit 6 sets all of the identification signals S1, S2, S3, and S4 by the "L" level. When all of the identification signals S1, S2, S3, and S4 are set by the "L" level, the detecting circuit 5 generates the selection signals E0, E1, E2, and E4 by the "H", "L", "L", and "L" levels, respectively.

Therefore, the 4-dividing interpolation signals e and f in which the signals a1 and b1 are directly outputted as rectangular waves are selected from the interpolation signals obtained by the interpolation signal forming circuit 7. The OR operation is finally performed therefor, thereby deriving the interpolation output signals PCA and PCB having the same period as that of the signals a1 and b1 and corresponding to 4-division.

An example of a generating method of the identification signals S1 to S4 will now be described.

Figure 12A:
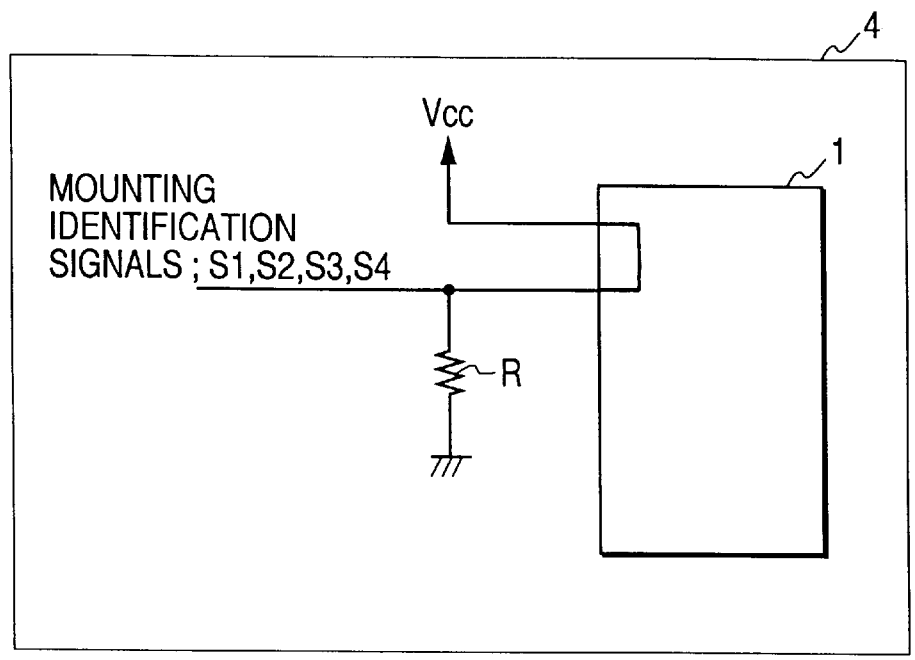
FIGS. 12A and 12B are explanatory diagrams of a generating method of identification signals S1 to S4.
Figure 12B:
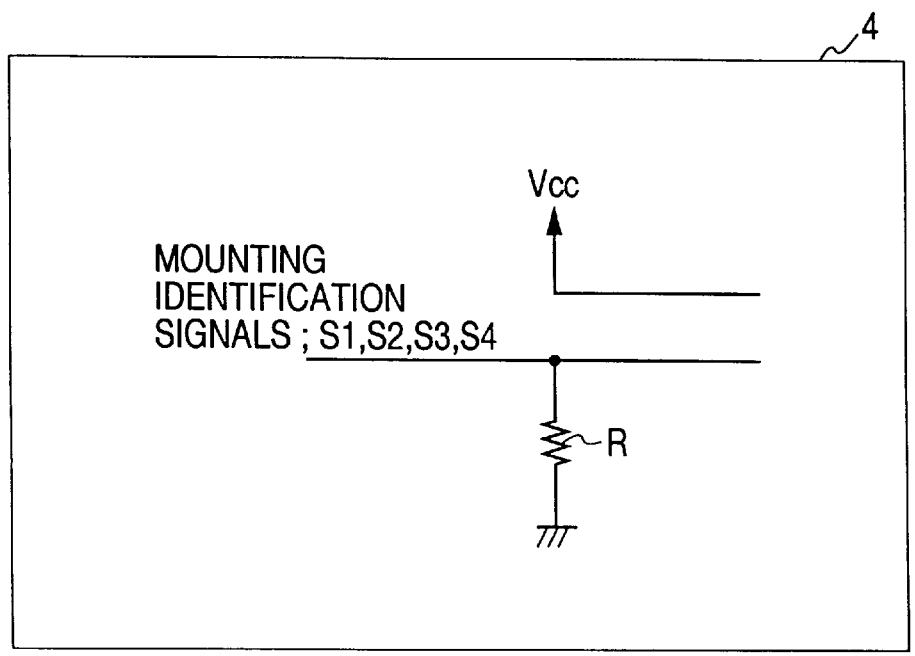

FIG. 12A is a diagram when an n-dividing board 1 is mounted on the base board 4. FIG. 12B is a diagram when the n-dividing board 1 is not mounted on the base board 4.

In both diagrams, the mounting identification signals S1 to S4 of the base board have been pulled down.

As shown in the diagrams, the n-dividing board 1 has preliminarily been designed in a manner such that when the n-dividing board 1 is inserted, one side of a resistor R (a voltage here becomes the signals S1, S2, S3, and S4) is connected to a power source Vcc.

When the n-dividing board 1 is mounted on the base board 4 as shown in FIG. 12A, the mounting identification signals S1 to S4 are connected to Vcc through the n-dividing board 1 and are set by the "H" level.

When the n-dividing board 1 is not mounted on the base board 4 as shown in FIG. 12B, the mounting identification signals S1 to S4 are set by the "L" level by the pull-down resistor R.

As mentioned above, the detection about the mounting of the n-dividing circuit can be realized by a simple construction.

In the above embodiment, there is shown a case where when the n-dividing board 1 is mounted on the base board 4, the mounting identification signal is set by the "H" level. However, the polarities can be also reversed. Such a case is attained by changing a logic circuit of the detecting circuit 6.

According to the above embodiment, even when designing an apparatus of a different divisional number, it can be easily realized by merely changing the number of first boards which are mounted onto a second board. The costs and complexity in terms of the designing, manufacturing, and management of products are remarkably reduced. Even when using the apparatus, a degree of freedom of processing can be increased.

What is claimed is:

1. An apparatus for performing an interpolating process on an input periodic signal, comprising:
    at least one first board including a partial circuit for performing the interpolating process; and
    a second board on which a plurality of said first boards can be mounted,
    wherein a divisional number of the interpolating process can be selected in accordance with the number of said first boards mounted onto said second board.

2. An apparatus according to claim 1, further comprising a circuit selecting unit for changing over a circuit configuration on said second board in correspondence with a mounting condition of said first boards.

3. An apparatus according to claim 1, wherein said first board is removably mounted onto said second board using a connector.

4. A position information detecting apparatus comprising:
    a head unit for obtaining two-phase signals indicative of relative displacement information between a scale and said head unit by a detection of the scale; and
    an electric interpolating circuit for performing an interpolating process to said two-phase signals,
    wherein said electric interpolating circuit includes
    i) at least one first board including a partial circuit for executing the interpolating process, and
    ii) a second board on which a plurality of said first boards can be mounted,
    and wherein a divisional number of the interpolating process can be selected in accordance with the number of said first boards mounted onto said second board.

5. An apparatus according to claim 4, further comprising a circuit selecting unit for changing over a circuit configuration on said second board in correspondence with a mounting condition of said first boards.

6. An apparatus according to claim 4, wherein said first board is removably mounted onto said second board using a connector.

7. An apparatus according to claim 4, wherein said electric interpolating circuit further has a two-phase signals whose phases are deviated from those of the adjacent sets at regular intervals from said two-phase signals.

8. An apparatus for performing an interpolating process of an input periodic signal, comprising:
    a signal input portion to which the periodic signal is inputted; and
    an electric interpolating circuit for performing the interpolating process on said periodic signal,
    wherein a partial circuit in a circuit configuration of said electric interpolating circuit is detachable, and the interpolating process can be changed by an attaching/detaching operation of said partial circuit.

9. An apparatus according to claim 8, wherein said partial circuit has a plurality of circuits with a same function.

10. An apparatus according to claim 9, wherein the contents of the interpolating process are also further changed in accordance with the number of said plurality of circuits with the same function which are attached.

11. A position information detecting apparatus comprising:
    a head unit for obtaining two-phase signals indicative of relative displacement information between a scale and said head unit by a detection of the scale; and
    an electric interpolating circuit for performing an interpolating process to said two-phase signals,
    wherein a partial circuit of a circuit configuration of said electric interpolating circuit is detachable and the interpolating process can be changed by an attaching/detaching operation of said partial circuit.

12. An apparatus according to claim 11, wherein said partial circuit has a plurality of circuits with a same function.

13. An apparatus according to claim 12, wherein the contents of the interpolating process are also further changed in accordance with the number of said plurality of circuits with the same function which are attached.

14. An apparatus according to claim 11, wherein said electric interpolating circuit further has a phase converter for generating a plurality of sets of two-phase signals whose phases are deviated from those of the adjacent sets at regular intervals from said two-phase signals.

15. An apparatus for performing an interpolating process of an input periodic signal, comprising:
    a signal input portion to which the periodic signal is inputted; and
    an electric interpolating circuit for performing the interpolating process on said periodic signal,
    wherein said electric interpolating circuit can change the interpolating process in accordance with an attaching condition of a partial circuit of a circuit configuration.

16. An apparatus according to claim 15, wherein said electric interpolating circuit includes means for detecting the attaching condition of the partial circuit of the circuit configuration, and the interpolating process is changed on the basis of a detection by said detecting means.

17. A method of performing an interpolating process of an input periodic signal, comprising the steps of:
    detecting an attaching/detaching condition of a part of a circuit configuration to perform the interpolating process of the periodic signal; and
    changing the interpolating process on the basis of said detection.

18. A method according to claim 17, wherein said step of detecting an attaching/detaching condition comprises the step of detecting mounting number information.

* * * * *

UNITED STATES PATENT AND TRADEMARK OFFICE
CERTIFICATE OF CORRECTION

PATENT NO.    : 5,918,202

DATED         : June 29, 1999

INVENTOR(S)   : Hidefumi Kuroki, et al.

It is certified that error appears in the above-identified patent and that said Letters Patent is hereby corrected as shown below:

<u>COLUMN 7</u>
  Line 62, "two-phase" should read --phase convertor for generating a plurality of sets of two-phase--.

Signed and Sealed this

Twenty-seventh Day of June, 2000

Attest:

Q. TODD DICKINSON

Attesting Officer        Director of Patents and Trademarks